United States Patent [19]
Hayasaka

[11] Patent Number: 5,982,075
[45] Date of Patent: Nov. 9, 1999

[54] ULTRASONIC LINEAR MOTOR

[75] Inventor: Toshimi Hayasaka, Hachioji, Japan

[73] Assignee: Olympus Optical Co., Ltd., Tokyo, Japan

[21] Appl. No.: 08/792,987

[22] Filed: Feb. 3, 1997

[30] Foreign Application Priority Data

Feb. 5, 1996 [JP] Japan .................................. 8-019019

[51] Int. Cl.⁶ .................................................. H02N 2/00
[52] U.S. Cl. ............................ 310/323; 310/12; 310/328
[58] Field of Search .............................. 310/12, 323, 328

[56] References Cited

U.S. PATENT DOCUMENTS

| | | | |
|---|---|---|---|
| 5,105,117 | 4/1992 | Yamaguchi | 310/323 |
| 5,416,375 | 5/1995 | Funakubo et al. | 310/323 |
| 5,726,520 | 3/1998 | Grahn | 310/328 |

FOREIGN PATENT DOCUMENTS 6-284752  10/1994  Japan .

Primary Examiner—Thomas M. Dougherty
Attorney, Agent, or Firm—Frishauf, Holtz, Goodman, Langer & Chick

[57] ABSTRACT

An ultrasonic linear motor of the present invention comprises an ultrasonic vibrator which has an electromechanical energy converting element and presses a driven member to produce a driving force for driving the driven member, a pair of pressing members which are arranged so as to sandwich the vibrator and exert a pressing force on the driven member at the positions corresponding to nodes of a standing wave on the vibrator, a support member which pivotally supports the pressing members, and an elastic member which exerts simultaneously on the pair of pressing members a deflecting force serving as a pressing force to the driven member.

18 Claims, 8 Drawing Sheets

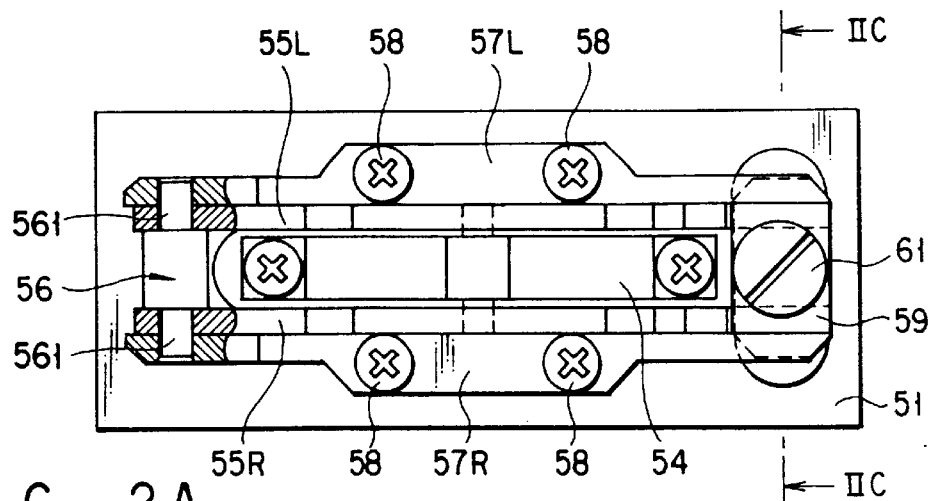
F I G. 2A
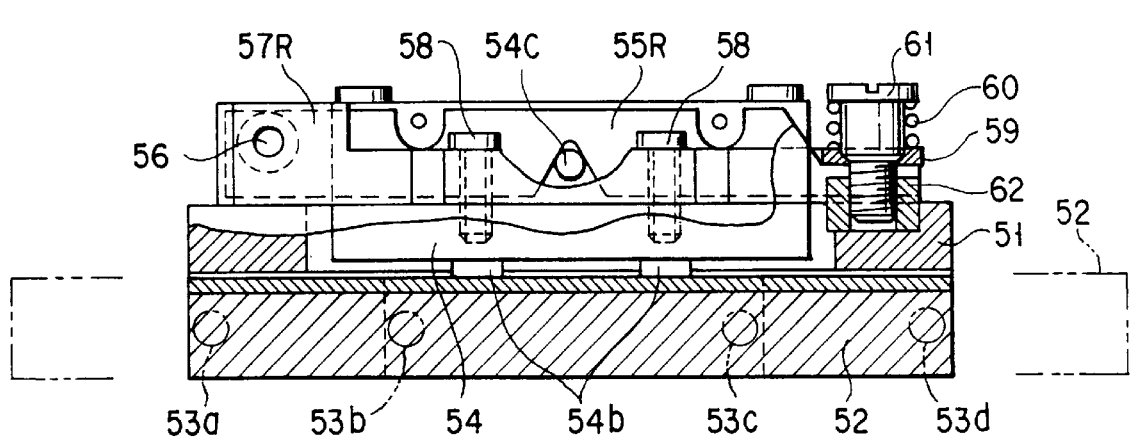
F I G. 2B
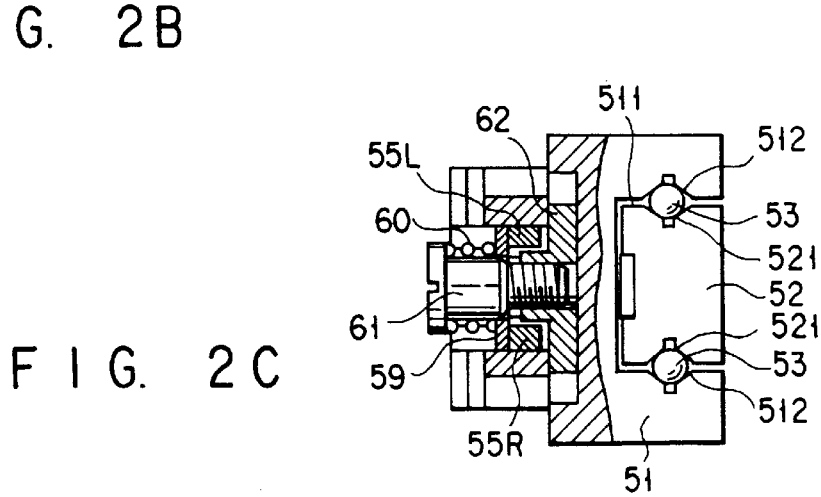
F I G. 2C
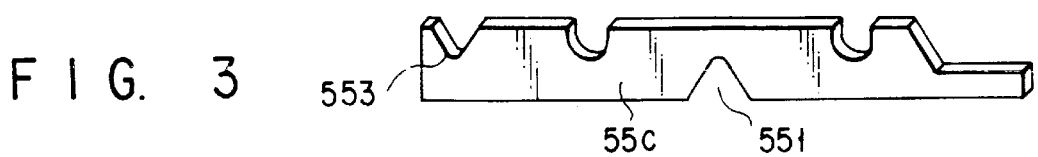
F I G. 3

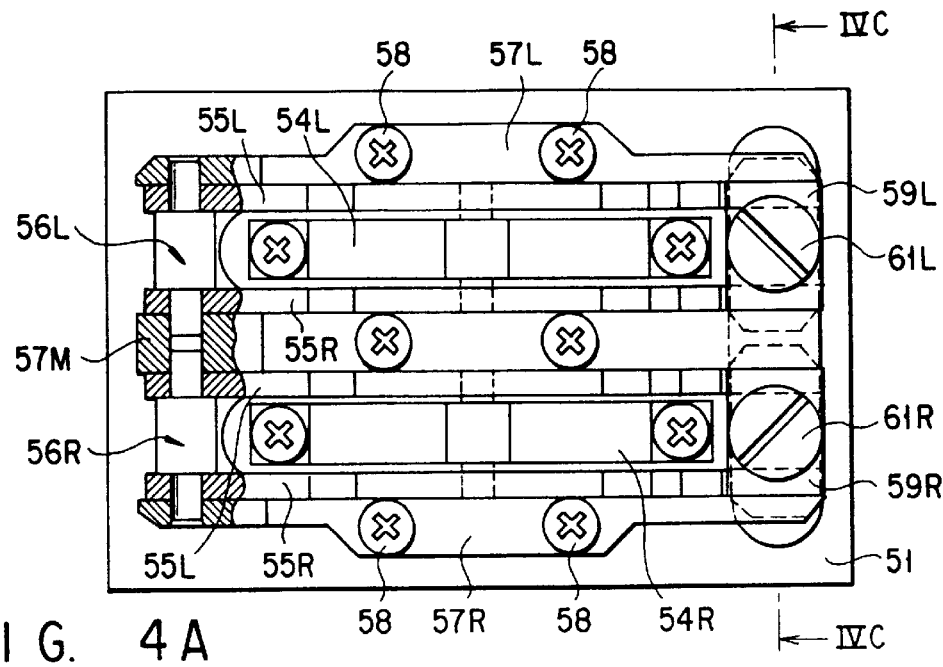
F I G. 4A
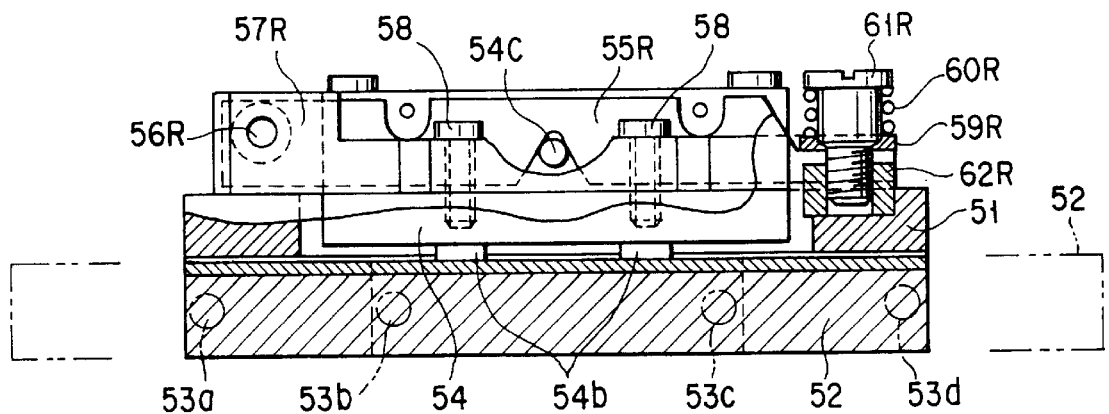
F I G. 4B
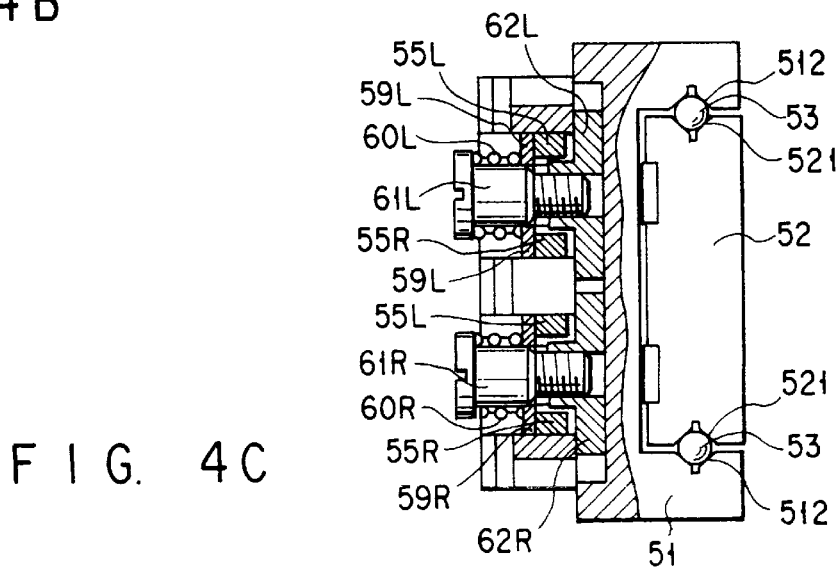
F I G. 4C

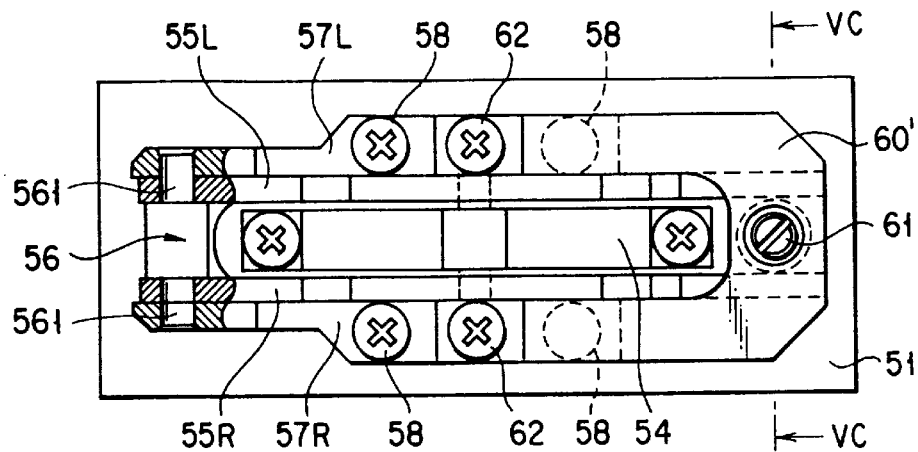
F I G. 5A
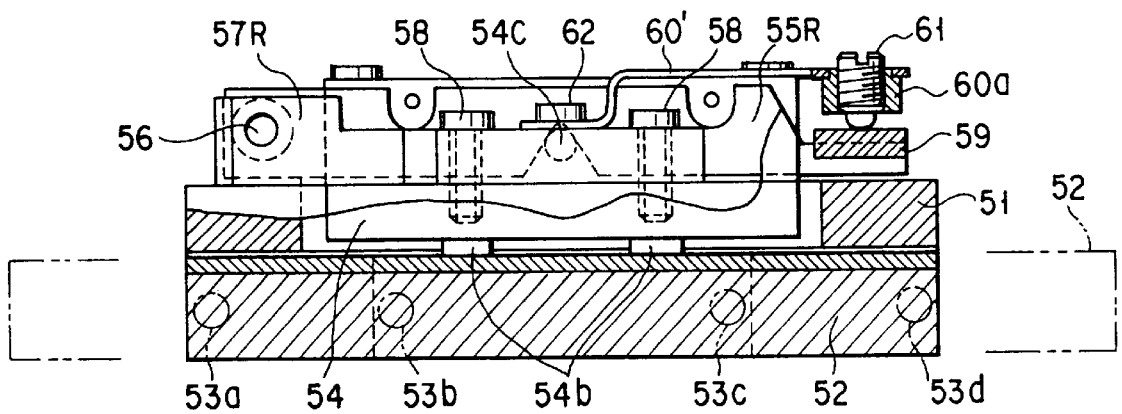
F I G. 5B
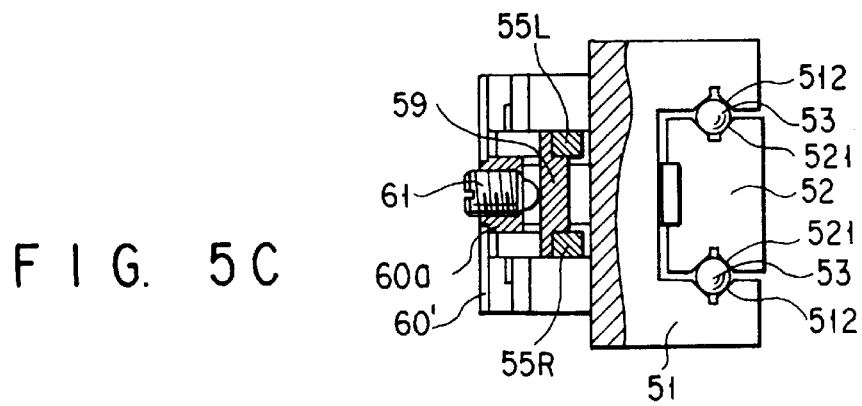
F I G. 5C

ULTRASONIC LINEAR MOTOR

BACKGROUND OF THE INVENTION

This invention relates to an ultrasonic linear motor using an electromechanical energy converting element as a driving source, such as an ultrasonic linear motor that moves a driven member linearly by means of a standing-wave ultrasonic motor.

In recent years, an increasing number of ultrasonic motors have been used in the fields of precision machines and optical instruments, because ultrasonic motors have the advantage of being smaller in size, producing a higher torque, having a longer stroke, and providing a higher resolution than electromagnetic motors. Such ultrasonic motors are roughly divided into the rotary type and the linear type. Ultrasonic motors of the linear type have been disclosed in Jpn. Pat. Appln. KOKAI Publication No. 6-284752 and U.S. Pat. No. 5,416,375.

To the ultrasonic motor disclosed in Jpn. Pat. Appln. KOKAI Publication No. 6-284752, an electromechanical energy converting element is stuck. The longitudinal dimension and breadthwise dimension of the ultrasonic motor are set so that the resonance frequency at which the electromechanical energy converting element expands and contracts longitudinally may coincide with the frequency at which a traverse elastic wave whose propagation direction is the direction in which the converting element expands and contracts should stand.

Furthermore, the ultrasonic motor is provided with a vibrator on which an expanding and contracting vibration and a standing wave are generated simultaneously according to the vibrational displacement of the electromechanical energy converting element and with sliding projections that are provided so as to project from the position corresponding to bellies of the standing wave on the surface of the vibrator and are driven by the vibration of the vibrator so as to draw a rotary locus. Additionally, the ultrasonic motor is provided with a support shaft so that it may project from both side faces of the vibrator at the position corresponding to a node of the standing wave on the vibrator. When the support shaft is pressed downward, the vibrator is pressed against the driven member, causing the driven member to be moved according to the vibration of the vibrator.

FIGS. 9A and 9B schematically show the configuration of an example of the above-mentioned ultrasonic liner motor. FIG. 9A is a plan view and FIG. 9B is a front sectional view. As shown in FIGS. 9A and 9B, the vibrator 2 is composed of an elastic material 3 taking the form of an almost rectangular parallelopiped. At the top of the elastic material 3, two rectangular cutouts 3a are made in the lengthwise direction. Into each of the cutouts 3a, a laminated piezoelectric element 4 is fitted and fixed. In the two positions on the bottom surface of the elastic material 3 at which bellies of the vibration appear, sliding members 5 are stuck with a one-to-one correspondence. The vibrator 2 is provided with a support shaft 6 so that the shaft may project from both sides of the elastic member 3 at the position that corresponds to a node of the second-order standing wave and is between the two laminated piezoelectric elements 4.

The vibrator 2 is supported, via the support shaft 6 acting as a force acting point, by a hook member 7 with a recessed section that engages with the support shaft 6, and is pressed toward a driven member 9 via the sliding members 5. The hook member 7 is fastened to one end of a cantilever plate spring 11 with a screw 121. The other end of the plate spring 11 is secured to a base 14 via a pedestal 13 with a screw 122.

In Jpn. Pat. Appln. KOKAI Publication No. 6-284752, in addition to the aforementioned configuration, a configuration where the way of installing the plate spring and the shape of the plate spring have been improved, has also been disclosed as means for exerting force on the vibrator 2.

The aforementioned ultrasonic linear motor has the advantage of having a high resolution and a long stroke. To make use of these advantages, the ultrasonic linear motor is provided with a linear guide that moves the driven member accurately. In the conventional example, however, the related construction between the base 14 to which the plate spring 11 is secured and the driven member 9 has not been disclosed clearly and therefore it cannot be said definitely that the ultrasonic linear motor has a compact, high-performance structure. It is known that in the ultrasonic linear motor, a change in the force pressing the vibrator 2 results in a change in the driving thrust. Thus, the force pressing the vibrator 2 has a great effect on the characteristics of the motor.

The aforementioned ultrasonic linear motor, however, has a disadvantage in that since the pressing force is determined by the plate spring 11 used, errors in producing the remaining component parts including the plate spring 7 lead to a change in the pressing force, having an effect on the characteristics of the motor. In the case of a compact ultrasonic linear motor, in particular, the span of the plate spring 11 cannot be made too long, and inevitably a plate spring with a large spring constant is used, making the motor more liable to be affected by the aforesaid errors in production. There is another problem: because the plate springs 11, 11 press the support shaft 6 on both sides of the vibrator 2 separately, a difference in force between the two plate springs 11, 11 occurs, which prevents the vibrator 2 from being pressed perpendicularly against the driven member 19, making the movement of the driven member 9 unstable.

On the other hand, U.S. Pat. No. 5,416,375 has disclosed an ultrasonic linear motor where a coil spring is used to press the vibrator against the driven member and the pressing force of the coil spring is adjustable with an adjusting screw. In such an ultrasonic linear motor, the frame supporting the coil spring is larger than the miniaturized vibrator. The support member supports the vibrator so as to prevent the vibrator from being moved in the direction in which the driven member moves, while the vibrator is being pressed by the coil spring. A construction for supporting the vibrator, however, has not been disclosed clearly in the publication. If a concrete support mechanism is used, the configuration will become larger, causing a problem: the dimensions of the entire ultrasonic linear motor will be larger and production cost will rise.

As described above, the conventional ultrasonic linear motors have the problem that although the vibrator has been miniaturized, means for supporting and pressing the vibrator has not been miniaturized, resulting in a larger configuration and in the difficulty of producing a stable pressing force to the vibrator.

BRIEF SUMMARY OF THE INVENTION

The object of the present invention is to provide a compact, high-performance ultrasonic linear motor easy to manufacture which produces a stable pressing force to the vibrator and enables a smooth movement of the driven member.

The foregoing object is accomplished by providing an ultrasonic linear motor comprising: an ultrasonic vibrator which has an electromechanical energy converting element and presses a driven member to produce a driving force for driving the driven member; a pair of pressing members which are arranged so as to sandwich the vibrator and exert a pressing force on the driven member at the positions corresponding to nodes of a standing wave on the vibrator; a support member which pivotally supports the pressing members; and an elastic member which exerts simultaneously on the pair of pressing members a deflecting force serving as a pressing force to the driven member.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE SEVERAL VIEWS OF THE DRAWING

The accompanying drawings, which are incorporated in and constitute a part of the specification, illustrate presently preferred embodiments of the invention, and together with the general description given above and the detailed description of the preferred embodiments given below, serve to explain the principles of the invention.

FIG. 2A is a plan view of the configuration of the ultrasonic linear motor of the first embodiment;

FIG. 2B is a side view, partially in cross-section, of the configuration of the ultrasonic linear motor of the first embodiment;

FIG. 2C is a sectional view taken along line IIC—IIC of the plan view of the configuration of the ultrasonic linear motor of the first embodiment;

FIG. 3 is a view of a modification of the pressing plate in the first embodiment;

FIG. 4A is a plan view of the configuration of an ultrasonic linear motor according to a second embodiment of the present invention;

FIG. 4B is a side view, partially in cross-section, of the configuration of the ultrasonic linear motor of the second embodiment;

FIG. 4C is sectional view taken along line IVC—IVC of the plan view of the configuration of the ultrasonic linear motor of the second embodiment;

FIG. 5A is a plan view of the configuration of an ultrasonic linear motor according to a third embodiment of the present invention;

FIG. 5B is a side view, partially in cross-section, of the configuration of the ultrasonic linear motor of the third embodiment;

FIG. 5C is a sectional view taken along line VC—VC of the plan view of the configuration of the ultrasonic linear motor of the third embodiment;

DETAILED DESCRIPTION OF THE INVENTION

Figure 1:
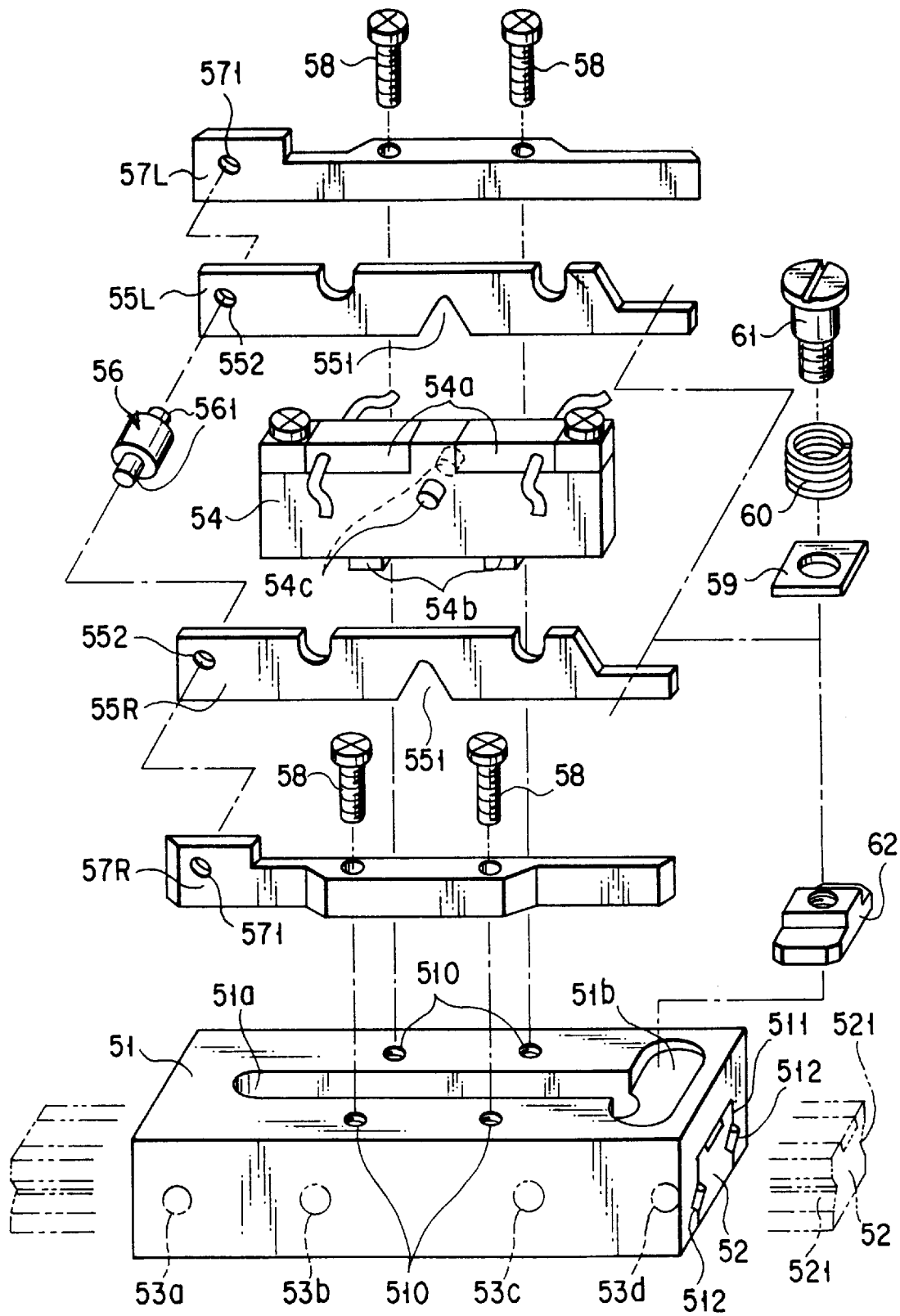
FIG. 1 is an exploded perspective view of the configuration of an ultrasonic linear motor according to a first embodiment of the present invention.

FIG. 1 is an exploded perspective view of the configuration of an ultrasonic linear motor according to a first embodiment of the present invention. FIGS. 2A, 2B, and 2C are views of the configuration of the ultrasonic linear motor: FIG. 2A is a plan view; FIG. 2B is a side view, partially in cross-section; and FIG. 2C is a sectional view taken along line IIC—IIC of the plan view. In FIG. 1 and FIGS. 2A, 2B, and 2C, the same parts are indicated by the same reference symbols.

In an external guide section 51 constituting a linear guide, a cutout 511 is made lengthwise in the middle of the bottom surface. In both side faces of the inner walls of the cutout 511, V grooves 512, 512 are made. An internal guide section 52 constituting the linear guide is inserted into the cutout 511 in such a manner that the internal guide section 52 moves lengthwise freely along the V grooves 512 via a plurality of balls (or a plurality of cross rollers) 53 held in the V grooves 512. In both side faces of the internal guide section 52, V grooves 521, 521 are made which hold the balls (or cross rollers) 53.

With such a configuration, as the internal guide section 52 moves, the balls (or cross rollers) 53 rotate and move between the V groove 512 and V groove 521 made in the external guide section 51 and internal guide section 52, respectively. Each of the balls (or cross rollers) moves along the V grooves 512, 521 by half of the distance over which the internal guide section 52 moves.

In FIGS. 1 and 2B, reference symbols 53a and 53c indicate the positions in which the balls (or rollers) at the left-side end and the right-side end in the row of balls (or rollers) are when the internal guide section 52 has moved to the leftmost end. Reference symbols 53b and 53d indicate the positions in which the balls (or rollers) at the left-side end and the right-side end in the row of balls (or rollers) are when the internal guide section 52 has moved to the rightmost end. In the space that the V grooves 512 and 521 form, a plurality of balls or cross rollers (not shown) are arranged between 53a and 53c (between 53b and 53d).

In the top side of the external guide section 51, a long hole 51a that penetrates to the cutout 511 is made. At one end of the long hole 51a, a long groove 51b is made in the direction perpendicular to the long hole 51a. An ultrasonic vibrator 54 is placed on the top side of the external guide section 51. The ultrasonic vibrator 54 has two laminated piezoelectric elements 54a provided on its top side and two sliding projections 54b provided on its bottom side so that they may project at the positions corresponding to bellies of the standing wave. Furthermore, a support shaft 54c is provided so as to project from both sides of the ultrasonic vibrator 54 at the position corresponding to a node of the standing wave on the ultrasonic vibrator 54.

As described above, the ultrasonic vibrator 54 has the laminated piezoelectric elements 54a (electromechanical energy converting element) provided on its top side. The longitudinal dimension and breadthwise dimension of the laminated piezoelectric element 54a are set so that the resonance frequency at which the element expands and contracts longitudinally may coincide with the frequency at which a traverse elastic wave whose propagation direction is the direction in which the element expands and contracts should stand. Furthermore, the ultrasonic vibrator 54 is constructed so that an expanding and contracting vibration and a standing wave may be generated simultaneously according to the vibrational displacement of the laminated piezoelectric elements 54a. Sliding projections 54b are provided so as to project from the positions corresponding to bellies of the standing wave and are driven by both of the vibrations so as to draw a rotary locus.

The two sliding projections 54b on the bottom side of the ultrasonic vibrator 54 are pressed against the top side of the internal guide section 52 via the long hole 51a made in the external guide section 51. On both longitudinal side faces of the ultrasonic vibrator 54, pressing plates 55R, 55L are provided. Each of these pressing plates 55R, 55L has a V groove 551 made in the middle of it. The V grooves 551 press the support shaft 54c of the ultrasonic vibrator 54 downward and hold it. The support shaft 561 of a pressing plate support section 56 is inserted into a round hole 552 made at one end of each of the pressing plates 55R, 55L, thereby enabling the pressing plates 55R, 55L to be supported so that the plates can rotate around the support shaft 561.

Along the outside faces of these pressing plates 55R, 55L, pressing plate support members 57R, 57L are arranged respectively. Each of the pressing plate support members 57R, 57L is provided with a round hole 571 at one end portion. The support shafts 561 of the pressing plate support section 56 are inserted into the round holes 571 so as to have the pressing plate support section 56 supported and to support the pressing plates 55R, 55L rotatably supported by the pressing plate support section 56. This enables the pressing plates 55R, 55L to be supported by the pressing plate support members 57R, 57L, respectively, in such a manner that the plates 55R, 55L can rotate without looseness. Each of the pressing plate support members 57R, 57L is secured to the top side of the external guide section 51 with two fixing screws 58 in such a manner that the member is integrated with the external guide section 51. The fixing positions 510 with the fixing screws 58 are between the balls (or cross rollers) at the extreme ends of the stroke of the internal guide section 52 (i.e., between 53b and 53c).

A spring washer 59 is provided on the other ends of the pressing plates 55R, 55L provided on both sides of the ultrasonic vibrator 54. The spring washer 59 enables a coil spring 60 to press the other ends of the pressing plates 55R, 55L downward simultaneously. A spring shaft 61 is inserted into the hollow of the coil spring 60 and is screwed into a nut 62 so as to press the coil spring 60, thereby exerting a deflecting force clockwise on the pressing plates 55R, 55L via the spring washer 59, centered on the pressing plate support shaft 56.

The nut 62 is fitted into the long groove 51b at the top side of the external guide section 51. The bottom sides of the other ends of the pressing plate support members 57R, 57L are pressed against the top sides of the thinner portions on both sides of the nut 62, thereby preventing the nut 62 from slipping off. The nut 62 can move a little up and down within the long groove 51b. When the top side of the nut 62 comes into contact with the bottom sides of the pressing plate support members 57R, 57L, the bottom side of the nut 62 separates from the bottom side of the long groove 51b.

Such a configuration enables the pressing plates 55R, 55L placed on both sides of the ultrasonic vibrator 54 to rotate on the pressing plate support shaft 56 but disables them from moving from one position to another. This prevents the ultrasonic vibrator 54 whose support shaft 54c is pressed and held by the V grooves 551 of the pressing plates 55R, 55L from moving in the longitudinal direction of the vibrator. As a result, when the ultrasonic vibrator 54 is driven and ultrasonic vibrations occur and then the vibration is transmitted to the internal guide section 52 against which the sliding projections 54b are pressed, only the internal guide section 52 is moved relatively along the hollow 512 of the external guide section 51.

Since each of the pressing plates 55R, 55L is formed into a lever-like shape where the ratio of the distance from the supporting point of the pressing plate support shaft 56 to the pressing point at which the V groove 551 presses and holds the ultrasonic vibrator 54 to the distance from the supporting point to the actuating point at which the coil spring 60 actuates the plate via the spring washer 59, is almost 1:2, the plate can be realized by setting half of the spring force needed in the case of directly pressing the support shaft 54c of the ultrasonic vibrator 54.

Because the nut 62 is fitted into the long groove 51b at the top side of the external guide section 51 to prevent the nut from rotating, even if the spring shaft 61 is turned to adjust the actuating force of the coil spring 60, the nut 62 will never rotate. Therefore, after the assembly of the ultrasonic linear motor, just turning the spring shaft 61 enables the actuating force of the coil spring 60 to be adjusted easily. Furthermore, the nut 62 is pressed against the bottom sides of the other ends of the pressing plate support members 57R, 57L, thereby supporting the spring shaft 61. As a result, the deflecting force of the coil spring 60 tending to deform the pressing plate support members 57R, 57L and therefore the external guide section 51 is concentrated on the portion fixed with the fixing screw 58.

On the other hand, the positions at which the pressing plate support members 57R, 57L are secured to the top side of the external guide section 51 are between the balls (or cross rollers) 53 at the extreme ends of the stroke of the internal guide section 52 as described above, that is, between 53b and 53c. This makes the external guide section 51 less liable to be deformed, which enables the internal guide section 52 to move smoothly in a uniform way over the entire stroke.

Moreover, since the pressing plate support members 57R, 57L are made thinner at both ends as shown in the figure, a cover to cover the ultrasonic vibrator 54 or a fixing member for building the ultrasonic linear motor in a specific apparatus may be provided, making use of the space produced by the thinner portions, which helps make the linear guide more compact.

Thus, the deflecting force of the single coil spring 60 presses the pressing plates 55R, 55L provided on both sides of the ultrasonic vibrator 54, which makes the pressing forces on both sides of the ultrasonic vibrator 54 less liable to lose their balance, enabling the internal guide section 52 to make a highly reversible, stable movement even during its reciprocating motion. Use of the single coil spring 60 saves space, helping realize a compact, low-cost ultrasonic linear motor.

Because the pressing plates 55R, 55L are formed into a lever-like shape, the force of the coil spring 60 actuating these plates is smaller, enabling the use of a coil spring 60 with a small spring constant for a space-saving configuration. This helps minimize variations in pressing force due to errors in producing each component parts, promoting the ease of production.

Since the ultrasonic vibrator 54 is provided on the long hole 51a in the external guide section 51, the sliding projections 54b are pressed against the internal guide section 52, and the pressing plates 55R, 55L and the pressing plate support members 57R, 57L are provided on both sides of the ultrasonic vibrator 54, the configuration is smaller in height and therefore a compact ultrasonic linear motor is achieved. For reference, the ultrasonic linear motor can be designed to have a size measuring 25 mm high and 22 mm wide.

Since the fixing positions 510 at which the pressing plate support members 57R, 57L are secured to the external guide section 51 are between the balls (or cross rollers) 53 at both extreme ends of the stroke of the internal guide section 52, the balls (or cross rollers) 53 always exist without and below the two fixing positions 510, 510. This makes the external guide section 51 less liable to be deformed due to the pressing force over the entire stroke through which the internal guide section 52 moves, enabling the internal guide section 52 to move stably. Preventing the deformation of the external guide section 51 enables the external guide section 51, or the linear guide, from becoming unnecessarily large and expensive.

Furthermore, because the spring force or deflecting force of the coil spring 60 can be adjusted easily by adjusting the screwing of the spring shaft 61, adjustment can be made easily so that the most effective pressing force may be exerted on the ultrasonic vibrator 54. Since the spring shaft 61 is provided at the end of the ultrasonic linear motor, even if, for example, a joining member for incorporating the motor in a specific position is mounted, or if units of the ultrasonic linear motor are combined to form a three-axis micromanipulator, it is easy to construct the micromanipulator so that the force of the spring may be externally adjusted after the assembly, making it possible to provide an easy-to-assemble, high-performance micromanipulator.

FIG. 3 is a view of a pressing plate 55C, a modification of the pressing plates 55R, 55L in the first embodiment. With the pressing plate 55C, the portion supported by the support shaft 561 of the pressing plate support section 56 takes the form of a V groove 553, not a round hole. This eliminates the engaging looseness of the support shaft 561, improving the positional accuracy of the ultrasonic vibrator 54 more.

FIGS. 4A, 4B, and 4C are views of the configuration of an ultrasonic linear motor according to a second embodiment of the present invention: FIG. 4A is a plan view; FIG. 4B is a side view, partially in cross-section; and FIG. 4C is a sectional view taken along line IVC—IVC of the plan view. In FIGS. 4A, 4B, and 4C, the same parts as those in FIG. 1 and FIGS. 2A, 2B, and 2C are indicated by the same reference symbols. The second embodiment will be explained, centering on the portions differing from the first embodiment.

The ultrasonic linear motor of the second embodiment is such that two units of the ultrasonic vibrator and its pressing support structure in the first embodiment are arranged in parallel with the external guide section of a linear guide, thereby increasing the driving force of the ultrasonic linear motor.

In the external guide section 51 of the linear guide in the ultrasonic linear motor, two units of the long hole 51a are made side by side. Ultrasonic vibrators 54R, 54L are provided for the two long holes 51a with a one-to-one correspondence. These two ultrasonic vibrators 54R, 54L are placed on the top side of the external guide section 51. The individual sliding projections 54b of the ultrasonic vibrators 54R, 54L are pressed against the top side of the internal guide section 52 via the corresponding long holes 51a.

On both sides of each of the ultrasonic vibrators 54R, 54L, pressing plates 55R, 55L are provided. A pressing plate support member 57R is arranged along the external side face of the pressing plate 55R on the side face of the ultrasonic vibrator 54R. A pressing plate support member 57L is arranged along the external side face of the pressing plate 55L on the side face of the ultrasonic vibrator 54L.

Between the ultrasonic vibrators 54R and 54L, or between the pressing plate 55L for the ultrasonic vibrator 54R and the pressing plate 55R for the ultrasonic vibrator 54L, a pressing plate support member 57M is provided. The pressing plate support member 57M and pressing plate support members 57R, 57L support two pressing plate shafts 56R, 56L and two spring washers 59R, 59L simultaneously. Specifically, the pressing plate support member 57M and pressing plate support member 57R support the spring washer 59R, and the pressing plate support member 57M and pressing plate support member 57L support the spring washer 59L. The spring shaft 61R and coil spring 60R press the spring washer 59R against a nut 62R and the spring shaft 61L and coil spring 60L press the spring washer 59L against a nut 62L.

With this configuration, the internal guide section 52 is driven by the two ultrasonic vibrators 54R, 54L simultaneously, producing a large driving force. The pressing plate support member 57M provided between the ultrasonic vibrators 54R and 54L is used to support both of the ultrasonic vibrators 54R and 54L, helping save space, so although two ultrasonic vibrators are used, an ultrasonic linear motor with a large driving force can be realized without increasing the size too much.

The portions of the pressing plates 55R, 55L supported by the support shaft 561 may take the form of the V groove shown in FIG. 3 as a modification of the first embodiment. To increase the driving force of the ultrasonic linear motor, three or more units of the ultrasonic vibrator and its pressing support structure described above may be arranged in parallel with the external guide section of the linear guide.

FIGS. 5A, 5B, and 5C are views of the configuration of an ultrasonic linear motor according to a third embodiment of the present invention: FIG. 5A is a plan view; FIG. 5B is a side view, partially in cross-section; and FIG. 5C is a sectional view taken along line VC—VC of the plan view. In FIGS. 5A, 5B, and 5C, the same parts as those in FIG. 1 and FIGS. 2A, 2B, and 2C are indicated by the same reference symbols. The third embodiment will be explained, centering on the portions differing from the first embodiment. The ultrasonic linear motor of the third embodiment is such that, in place of the coil spring shown in the first embodiment, a plate spring is used to actuate the pressing plate.

In the ultrasonic linear motor, a U-shaped plate spring 60' is placed on the pressing plate support members 57R, 57L arranged along the external side faces of the pressing plates 55R, 55L. The two tip portions of the plate spring 60' are fixed to the pressing plate support members 57R, 57L with screws 62. The curved portion of the plate spring 60' is provided integrally with a nut 60*a*. When an adjusting screw 61 is screwed into the nut 60*a,* this actuates via the spring washer 59 simultaneously the pressing plates 55R, 55L provided on both sides of the ultrasonic vibrator 54.

With the configuration, turning the adjusting screw 61 enables the actuating force of the plate spring 60' to be adjusted easily. Since the plate spring 60' is secured to the pressing plate support members 57R, 57L, the external guide section 51 of the linear guide is less liable to be deformed as in the first embodiment. Consequently, the configuration of the third embodiment produces the same effect as described in the first embodiment. The portions supported by the support shaft 561 of the pressing plates 55R, 55L may take the form of the V groove shown in FIG. 3 as a modification of the first embodiment.

Figure 6A:
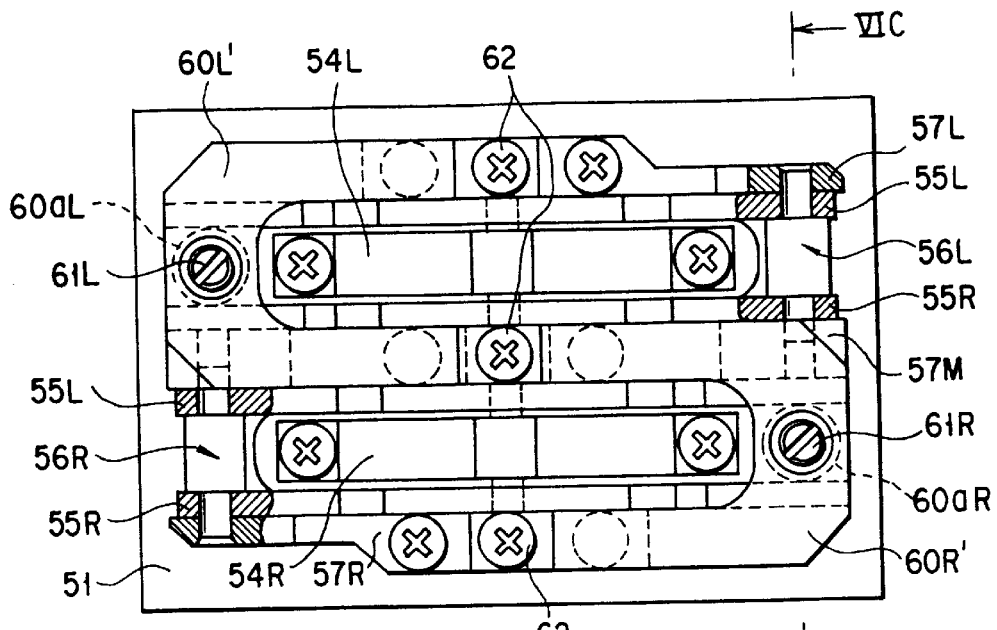
FIG. 6A is a plan view of the configuration of an ultrasonic linear motor according to a fourth embodiment of the present invention.
Figure 6B:
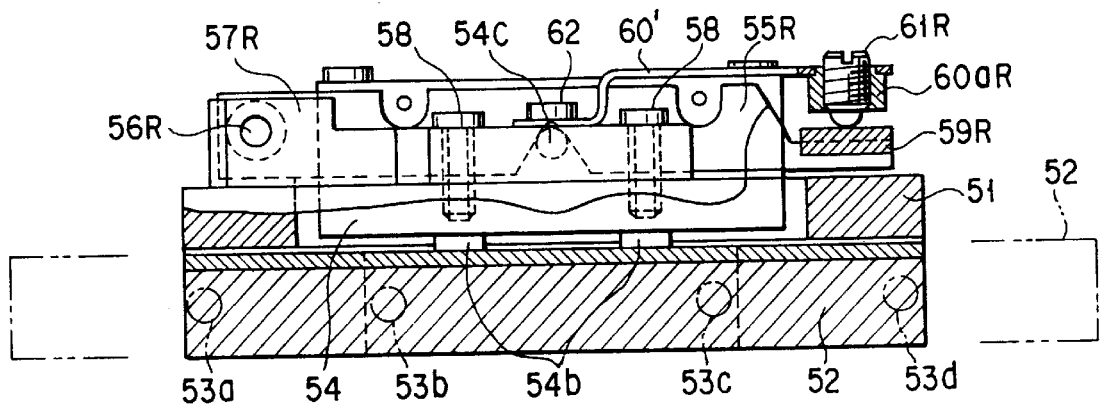
FIG. 6B is a side view, partially in cross-section, of the configuration of the ultrasonic linear motor of the fourth embodiment.
Figure 6C:
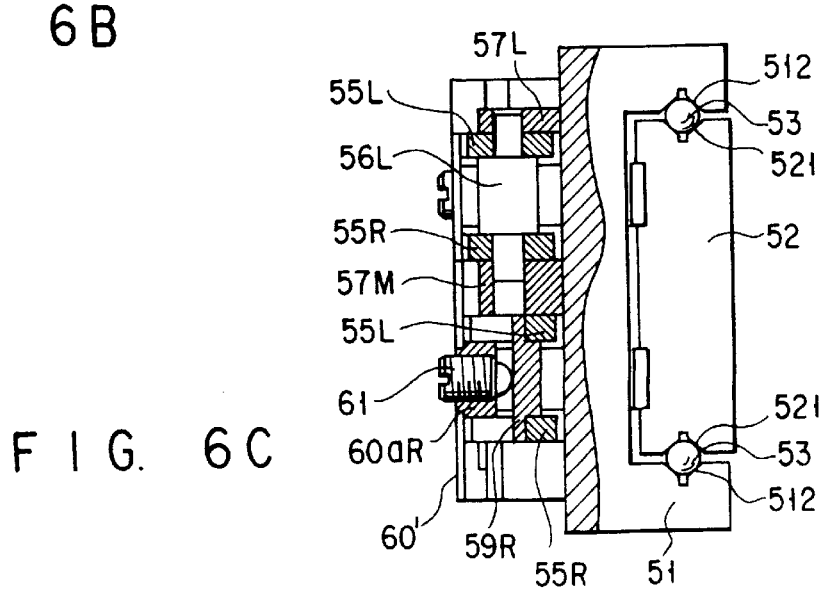
FIG. 6C is a sectional view taken along line VIC—VIC of the plan view of the configuration of the ultrasonic linear motor of the fourth embodiment.

FIGS. 6A, 6B, and 6C are views of the configuration of an ultrasonic linear motor according to a fourth embodiment of the present invention: FIG. 6A is a plan view; FIG. 6B is a side view, partially in cross-section; and FIG. 6C is a sectional view taken along line VIC—VIC of the plan view. In FIGS. 6A, 6B, and 6C, the same parts as those in FIG. 1 and FIGS. 2A to 2C, FIGS. 4A to 4C, and FIGS. 5A to 5C are indicated by the same reference symbols. The fourth embodiment will be explained, centering on the portions differing from the first to third embodiments.

The ultrasonic linear motor of the fourth embodiment is such that two groups of an ultrasonic vibrator and its pressing support structure are arranged in parallel with the external guide section of the linear guide to increase the driving force of an ultrasonic liner motor as in the second embodiment and two units of the U-shaped plate spring shown in the third embodiment are used as actuating means to actuate the pressing plates.

In the external guide section 51 of the linear guide in the ultrasonic linear motor, two units of the long hole 51*a* are made side by side. Ultrasonic vibrators 54R, 54L are provided for the two long holes 51*a* with a one-to-one correspondence. These two ultrasonic vibrators 54R, 54L are placed on the top side of the external guide section 51. The individual sliding projections 54*b* of the ultrasonic vibrators 54R, 54L are pressed against the top side of the internal guide section 52 via the corresponding long holes 51*a*. The width of the internal guide section 52 is twice that in the third embodiment.

On both sides of each of the ultrasonic vibrators 54R, 54L, pressing plates 55R, 55L are provided. The pressing plates 55R, 55L on both sides of the ultrasonic vibrator 54R are arranged in the opposite direction to the pressing plates 55R, 55L on both sides of the ultrasonic vibrator 54L. Specifically, a round hole 552 is made at the left end of each of the pressing plates 55R, 55L on both sides of the ultrasonic vibrator 54R in FIGS. 6A and 6B, whereas a round hole 552 is made at the right end of each of the pressing plates 55R, 55L on both sides of the ultrasonic vibrator 54L in FIGS. 6A and 6B. According to this, the spring washer 59R, nut 60*a*R, adjusting screw 61R, and pressing plate support shaft 56L are arranged at right of FIGS. 6A, and 6B, whereas the spring washer 59L (not shown), nut 60*a*L, adjusting screw 61L, and pressing plate support shaft 56R are arranged at left of FIGS. 6A, and 6B. Then, the U-shaped plate spring 60R' is correspondingly arranged in the opposite direction to the U-shaped plate spring 60L.

Between the ultrasonic vibrators 54R and 54L, or between the pressing plate 55L for the ultrasonic vibrator 54R and the pressing plate 55R for the ultrasonic vibrator 54L, a pressing plate support member 57M is provided. The pressing plate support member 57M and pressing plate support members 57R, 57L support the pressing plate shafts 56R, 56L and the spring washers 59R, 59L simultaneously. The spring shaft 61R and plate spring 60R' press the spring washer 59R against the pressing plate 55R and the spring shaft 61L and plate spring 60L' press the spring washer 59L (not shown) against the pressing plate 55L.

As described above, the pressing plate support member 57R is pivotally supported by the pressing support shaft 56R at one end of the pressing plate support member 57M and the pressing plate support member 57L is pivotally supported by the pressing support shaft 56L at the other end of the pressing plate support member 57M. The plate spring 60R' is placed on the pressing plate support member 57R and pressing plate support member 57M, and the plate spring 60L' is placed on the pressing plate support member 57L and pressing plate support member 57M. The tips on one side of the plate springs 60R', 60L' are fixed on the pressing plate support members 57R, 57L with screws 62 or the like, and the tips on the other side of the plate springs 60R', 60L' are fixed on the pressing plate support member 57M with screws 62 or the like. On the pressing plate support member 57M, the tip of the plate spring 60R' overlaps with that of the plate spring 60L' and they are fixed with the single screw 62. The curved portions of the plate springs 60R', 60L' are provided integrally with the nuts 60*a*R, 60*a*L. Screwing the adjusting screws 61R, 60L into the nuts 60*a*R, 60*a*L enables the pressing plates 55R, 55*l* to be actuated simultaneously via the spring washers 59R, 60L.

With this configuration, the internal guide section 52 is driven by the two ultrasonic vibrators 54R, 54L simultaneously, producing a large driving force. As a result, the configuration of the fourth embodiment produces the same effect as described in the second embodiment. The portions supported by the support shaft 561 of the pressing plates 55R, 55L may take the form of the V groove shown in FIG. 3 as a modification of the first embodiment. Instead of using two U-shaped plate springs, an S-shaped plate spring obtained by combining two U-shaped plate springs may be used to form the same configuration. To increase the driving force of the ultrasonic linear motor, three or more units of the ultrasonic vibrator and its pressing support structure described above may be arranged in parallel with the external guide section of the linear guide.

Figure 7A:
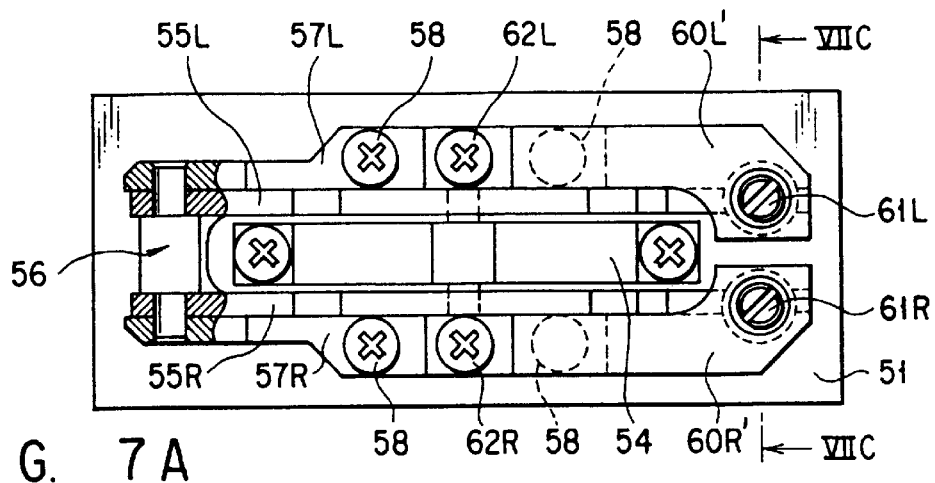
FIG. 7A is a plan view of the configuration of an ultrasonic linear motor according to a fifth embodiment of the present invention.
Figure 7B:
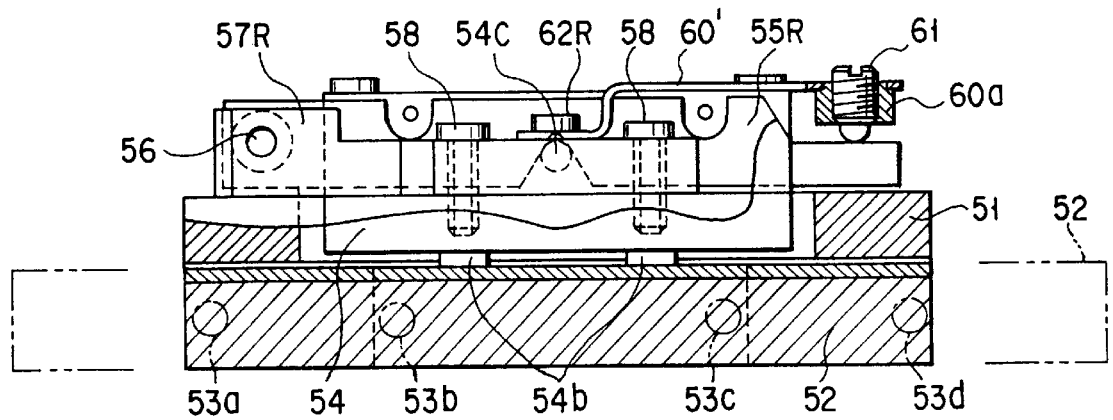
FIG. 7B is a side view, partially in cross-section, of the configuration of the ultrasonic linear motor of the fifth embodiment.
Figure 7C:
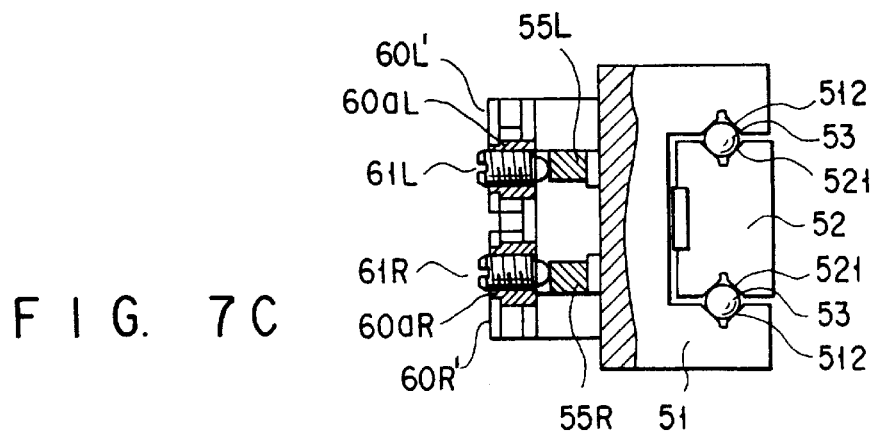
FIG. 7C is a sectional view taken along line VIIC—VIIC of the plan view of the configuration of the ultrasonic linear motor of the fifth embodiment.

FIGS. 7A, 7B, and 7C are views of the configuration of an ultrasonic linear motor according to a fifth embodiment of the present invention: FIG. 7A is a plan view; FIG. 7B is a side view, partially in cross-section; and FIG. 7C is a sectional view taken along line VIIC—VIIC of the plan view. In FIGS. 7A, 7B, and 7C, the same parts as those in FIG. 1 and FIGS. 2A to 2C, and FIGS. 5A to 5C are indicated by the same reference symbols. The fifth embodiment will be explained, centering on the portions differing from the third embodiment. The ultrasonic linear motor of the fifth embodiment is such that the U-shaped plate spring shown in the third embodiment is divided in two and each plate spring is designed to actuate the corresponding pressing plate separately.

In the ultrasonic linear motor, J-shaped plate springs 60R', 60L' (obtained by dividing a U-shaped plate spring in two) are placed on the pressing plate support members 57R, 57L arranged along the external side faces of the pressing plates 55R, 55L, respectively. The tip portions of the plate springs 60R', 60L' are fixed to the pressing plate support members 57R, 57L with screws 62R, 62L, respectively. The curved portions of the plate springs 60R', 60L' are provided integrally with nuts 60aR, 60aL, respectively. When adjusting screws 61R, 61L are screwed into the nuts 60aR, 60aL, respectively, this actuates the pressing plates 55R, 55L provided on both sides of the ultrasonic vibrator 54, respectively.

With the configuration, separately turning the adjusting screws 61R, 61L enables the actuating force of the plate springs 60aR, 60aL to be adjusted easily, which helps equalize the pressing force to the pressing plates 55R, 55L. Since the plate springs 60R', 60L' are secured to the pressing plate support members 57R, 57L, respectively, the external guide section 51 of the linear guide is less liable to be deformed as in the first embodiment. Consequently, the configuration of the fifth embodiment produces the same effect as described in the first embodiment. The portions supported by the support shaft 561 of the pressing plates 55R, 55L may take the form of the V groove shown in FIG. 3 as a modification of the first embodiment.

Figure 8A:
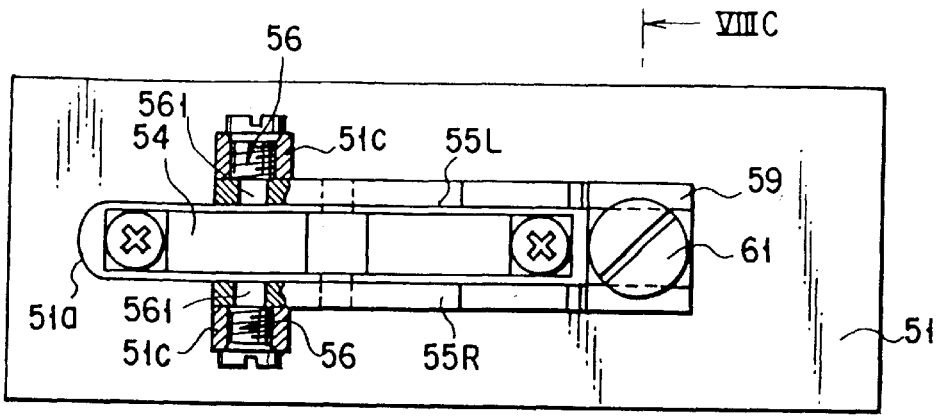
FIG. 8A is a plan view of the configuration of an ultrasonic linear motor according to a sixth embodiment of the present invention.
Figure 8B:
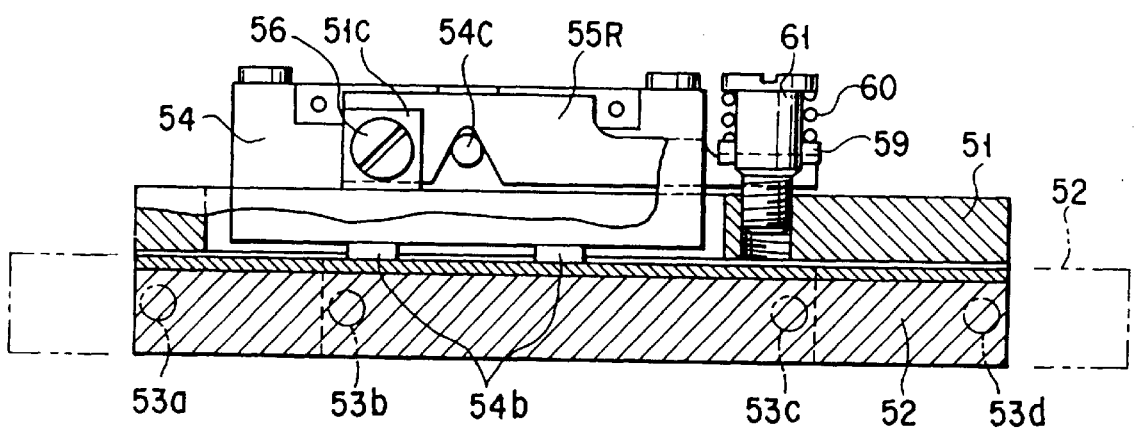
FIG. 8B is a side view, partially in cross-section, of the configuration of the ultrasonic linear motor of the sixth embodiment.
Figure 8C:
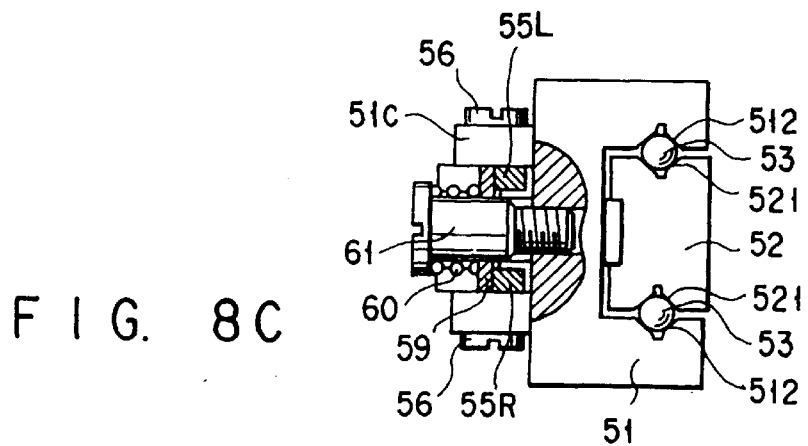
FIG. 8C is a sectional view taken along line VIIC—VIIC of the plan view of the configuration of the ultrasonic linear motor of the sixth embodiment.
Figure 9A:
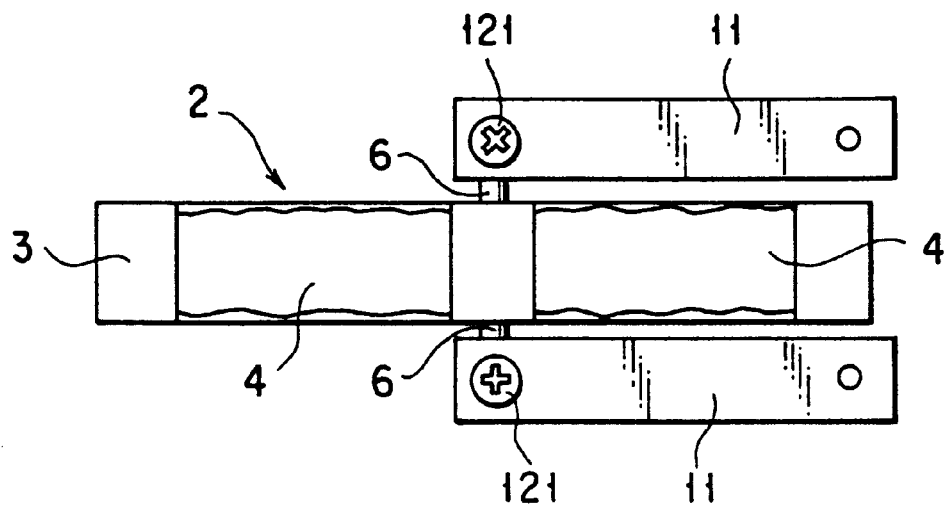
FIG. 9A is a plan view of the configuration of a conventional ultrasonic linear motor.
Figure 9B:
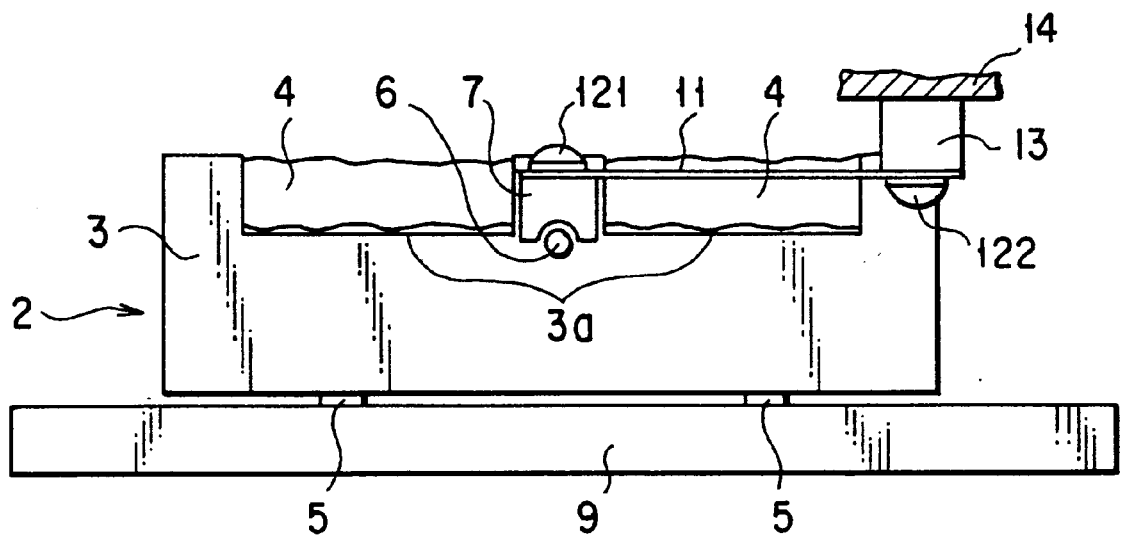
FIG. 9B is a front sectional view of the configuration of the conventional ultrasonic linear motor.

FIGS. 8A, 8B, and 8C are views of the configuration of an ultrasonic linear motor according to a sixth embodiment of the present invention: FIG. 8A is a plan view; FIG. 8B is a side view, partially in cross-section; and FIG. 8C is a sectional view taken along line VIIC—VIIC of the plan view. In FIGS. 8A, 8B, and 8C, the same parts as those in FIG. 1 and FIGS. 2A, 2B, and 2C are indicated by the same reference symbols. The sixth embodiment will be explained, centering on the portions differing from the first embodiment.

The ultrasonic linear motor of the sixth embodiment is such that the pressing plate support member and the external guide section of the linear guide shown in the first embodiment are formed integrally and the pressing plate support section is divided in two and these support sections are provided on both sides of the ultrasonic vibrator. The spring shaft is designed to be screwed directly into the external guide section.

In the external guide section 51 of the linear guide in the ultrasonic linear motor, the long hole 51a shown in FIG. 1 is made. The ultrasonic vibrator 54 is placed on the top side of the external guide section 51. The two sliding projections 54b are each pressed against the top side of the internal guide section 52 via the long hole 51a.

On the top side of the external guide section 51, a pair of pressing plate support projections 51c is provided in a manner that sandwiches the long hole 51a. Into the pressing plate support projections 51c, the pressing plate support section 56 is inserted. The support shaft 561 of the pressing plate support section 56 pivotally supports the ends on one side of the pressing plates 55R, 55L directly pressing the support shaft 54c of the ultrasonic vibrator 54. The spring washer 59 is provided on the other ends of the pressing plates 55R, 55L. The coil spring 60 supported by the spring shaft 61 actuates the spring washer 59. The position of the spring shaft 61 and the fixed position of the pressing plate support section 56 are designed to be between the balls (or cross rollers) 53 at both extreme ends of the stroke of the internal guide section 52.

With this configuration, the fixed position of the pressing plate support section 56 is closer to the support shaft 54c that presses and holds the ultrasonic vibrator 54, than in the first embodiment. This makes the actuating force of the coil spring 60 smaller in inverse proportion to the ratio of the distance from the support shaft 561 to the support shaft 54c to the distance from the support shaft 561 to the actuating point of the coil spring 60, enabling the actuating force of the weaker coil spring 60 to produce a suitable pressing force.

Furthermore, since the fixed position of the pressing plate support section 56 and the position in which the spring shaft 61 is screwed are between the balls (or cross rollers) 53 at both extreme ends of the stroke of the internal guide section 52, the external guide section 51 is less liable to be deformed by the pressing force as described earlier, enabling the internal guide section 52 to made a smooth movement over the entire stroke. Therefore, the sixth embodiment produces the same effect as in the first embodiment and has a reduced number of component parts, realizing a compact, low-cost ultrasonic linear motor.

The portions supported by the support shaft 561 of the pressing plates 55R, 55L may take the form of the V groove shown in FIG. 3 as a modification of the first embodiment. Instead of the coil spring, the plate spring described in the third embodiment may be used. To increase the driving force of the ultrasonic linear motor, two or more units of the ultrasonic vibrator and its pressing support structure described above may be arranged in parallel with the external guide section of the linear guide.

As described so far, with the present invention, since the common elastic member is designed to produce a deflecting force to a pair of pressing members arranged so as to sandwich the ultrasonic vibrator, the space is saved accordingly, realizing a compact, low-cost ultrasonic linear motor. Moreover, it is possible to make the deflecting force acting on the pressing members less liable to differ between the members, which makes the pressing forces caused by the pressing members less liable to lose their balance, enabling the driven member to make an accurate movement with less irregularity and further to make a highly reversible, stable movement even during its reciprocating motion.

Furthermore, since the deflecting force by the elastic member can be adjusted, the most efficient pressing force is obtained easily, therefore making it possible to realize an easy-to-assemble, high-performance ultrasonic linear motor. Moreover, by setting the fixed position of the support member to the fixing member between the positions of the balls or rollers at both extreme ends of the stroke of the driven member, the deformation of the external guide section of the linear guide serving as the fixing member is prevented from being deformed due to the deflecting force of the elastic member. This prevents the linear guide from becoming unnecessarily large to increase the rigidity and therefore from getting more expensive and enables the driven member to make a smooth movement over the entire stroke.

Additional advantages and modifications will readily occur to those skilled in the art. Therefore, the invention in its broader aspects is not limited to the specific details, and representative embodiments shown and described herein. Accordingly, various modifications may be made without departing from the spirit or scope of the general inventive concept as defined by the appended claims and their equivalents.

I claim:

1. An ultrasonic linear motor, comprising:
    an ultrasonic vibrator having an electro-mechanical energy converting element, said ultrasonic vibrator pressing a driven member to produce a driving force for driving the driven member;
    at least two lever-shaped pressing plates arranged to have said ultrasonic vibrator interposed therebetween and exerting a pressing force on said driven member at positions corresponding to nodes of a standing wave on said ultrasonic vibrator;

pressing plate supporting shafts for rotatably supporting said lever-shaped pressing plates;

at least two pressing plate supporting members for supporting said pressing plate supporting shafts; and a spring exerting on said lever-shaped pressing plates an urging force serving as a pressing force on said driven member.

2. An ultrasonic linear motor according to claim 1, wherein said pressing plates are in the shape of a lever, and said ultrasonic linear motor has points A, B and C, wherein A is the point at which each said lever-shaped pressing plate is supported by said pressing plate supporting shaft, C is the pressing point at which said ultrasonic vibrator is pressed, and B is the point at which the urging force of said spring is exerted, and wherein a ratio of a length between points A and C to the length between points A and B is about 1:2.

3. An ultrasonic linear motor according to claim 1, further comprising a guide member into which said driven member is inserted and a plurality of balls or rollers between said driven member and said guide member to guide a linear movement of said driven member, wherein each of said pressing plate supporting members is secured to said guide member at specific fixing positions and said fixing positions are located inside a position of said balls or rollers at both extreme ends of a stroke of said driven member.

4. An ultrasonic linear motor according to claim 1, wherein said spring is a coil spring, and wherein said ultrasonic linear motor further comprises means for controlling the urging force of said coil spring.

5. An ultrasonic linear motor according to claim 4, wherein said coil spring is held by a spring shaft, said pair of pressing plates and a nut.

6. An ultrasonic linear motor according to claim 4, further comprising a plurality of coil springs wherein the number of said coil springs is equal to the number of said pressing plates and the coil springs correspond respectively to the pressing plates.

7. An ultrasonic linear motor according to claim 1, wherein said spring is a plate spring, and wherein said ultrasonic linear motor further comprises means for controlling the urging force of said plate spring.

8. An ultrasonic linear motor according to claim 7, wherein said plate spring is secured to at least one of said pressing plate supporting members by a screw.

9. An ultrasonic linear motor according to claim 7, further comprising a plurality of plate springs wherein the number of said plate springs is equal to the number of said pressing plates and the plate springs correspond respectively to the pressing plates.

10. An ultrasonic linear motor having a plurality of units arranged in parallel, each unit comprising:

an ultrasonic vibrator having an electro-mechanical energy converting element, said ultrasonic vibrator pressing a driven member to produce a driving force for driving the driven member;

at least two lever-shaped pressing plates arranged to have said ultrasonic vibrator interposed therebetween and exerting a pressing force on said driven member at positions corresponding to nodes of a standing wave on said ultrasonic vibrator;

pressing plate supporting shafts for rotatably supporting said lever-shaped pressing plates;

at least two pressing plate supporting members for supporting said pressing plate supporting shafts; and a spring exerting on said lever-shaped pressing plates, an urging force serving as a pressing force on said driven member.

11. An ultrasonic linear motor according to claim 10, wherein said pressing plates are in the shape of a lever and said ultrasonic linear motor has points A, B and C, wherein A is the point at which said lever-shaped pressing plate is supported by said pressing plate supporting shaft, C is the pressing point at which each said ultrasonic vibrator is pressed, and B is the point at which the urging force of said spring is exerted, and wherein a ratio of the length between points A and C to the length between points A and B is about 1:2.

12. An ultrasonic linear motor according to claim 10, further comprising a guide member into which said driven member is inserted and which has a plurality of balls or rollers between said driven member and said guide member to guide a linear movement of said driven member, wherein each of said pressing plate supporting members is secured to said guide member at specific fixing positions and said fixing positions are located inside a position of said balls or rollers at both extreme ends of a stroke of said driven member.

13. An ultrasonic linear motor according to claim 10, wherein said spring is a coil spring, and wherein said ultrasonic linear motor further comprises means for controlling the urging force of said coil spring.

14. An ultrasonic linear motor according to claim 13, wherein said coil spring is held by a spring shaft, said pair of pressing plates and a nut.

15. An ultrasonic linear motor according to claim 13, further comprising a plurality of coil springs wherein the number of said coil springs is equal to the number of said pressing plates and the coil springs correspond respectively to the pressing plates.

16. An ultrasonic linear motor according to claim 10, wherein said spring is a plate spring, and wherein said ultrasonic linear motor further comprises means for controlling the urging force of said plate spring.

17. An ultrasonic linear motor according to claim 16, wherein said plate spring is secured to at least one of said pressing plate supporting members by a screw.

18. An ultrasonic linear motor according to claim 16, further comprising a plurality of plate springs, wherein the number of said plate springs is equal to the number of said pressing plates and the plate springs correspond respectively to the pressing plates.

* * * * *